United States Patent [19]
Kojima et al.

[11] Patent Number: 5,326,148
[45] Date of Patent: Jul. 5, 1994

[54] OPERATOR COMPARTMENT PROTECTING DEVICE FOR CONSTRUCTION VEHICLES

[75] Inventors: Toshio Kojima; Hiroshi Ishida, both of Kashiwazaki, Japan

[73] Assignee: Kabushiki Kaisha Komatsu Seisakusho, Tokyo, Japan

[21] Appl. No.: 990,432

[22] Filed: Dec. 14, 1992

[30] Foreign Application Priority Data

Dec. 12, 1991 [JP] Japan ................................. 109485

[51] Int. Cl.⁵ ....................... B62D 33/06; B60R 21/13
[52] U.S. Cl. ..................... 296/190; 296/102; 280/756
[58] Field of Search ................ 296/190, 102, 104; 280/756; 180/89.12

[56] References Cited

U.S. PATENT DOCUMENTS

| | | | |
|---|---|---|---|
| 3,599,813 | 8/1971 | Totz | 280/756 X |
| 3,954,150 | 5/1976 | Cole | 296/102 X |
| 3,973,796 | 8/1976 | Suzuki | 296/190 |
| 4,067,603 | 1/1978 | Fenton | 296/104 X |
| 4,205,874 | 6/1980 | Martin | 296/102 |
| 4,382,613 | 5/1983 | Haupt | 296/102 X |
| 4,411,464 | 10/1983 | Bauer | 296/102 |
| 4,781,260 | 11/1988 | Morita et al. | 296/190 X |

FOREIGN PATENT DOCUMENTS

| | | | |
|---|---|---|---|
| 446041 | 1/1948 | Canada | 296/104 |
| 2125595 | 2/1973 | Fed. Rep. of Germany | 296/190 |

Primary Examiner—Dennis H. Pedder
Attorney, Agent, or Firm—Richards, Medlock & Andrews

[57] ABSTRACT

An operator compartment protecting device (12) for construction vehicles is located to the rear and above an operator compartment (11) on a vehicle body (10) in order to protect the operator compartment (11). The operator compartment protecting device (12) includes: a gate-shaped support (15) including a pair of vertical members (13), and a connecting horizontal member (14) extending between and fixed by welding to a side surface of an upper end portion of one of the pair of vertical members (13) and a side surface of an upper end portion of the other of said pair of vertical members (13); a pair of beam members (16) each fixed by welding to the front surface of the upper end portion of each of the pair of vertical members (13) in such a manner that they are directed in a forward direction, and a ceiling plate (17) placed over and releasably secured, e.g., by bolts, to an upper surface of each of the pair of beam members (16), an upper surface of each of the pair of vertical members (13), and an upper surface of the connecting horizontal member. It is possible to lift the operator compartment (11) through the opening between the beam members (16) by merely releasing the engagement of the bolts (18).

20 Claims, 4 Drawing Sheets

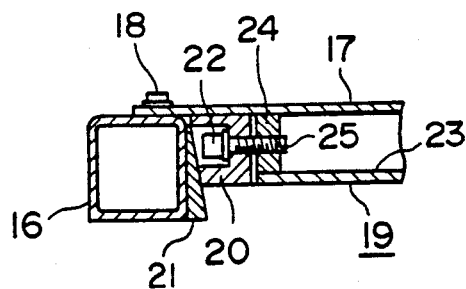
FIG. 5
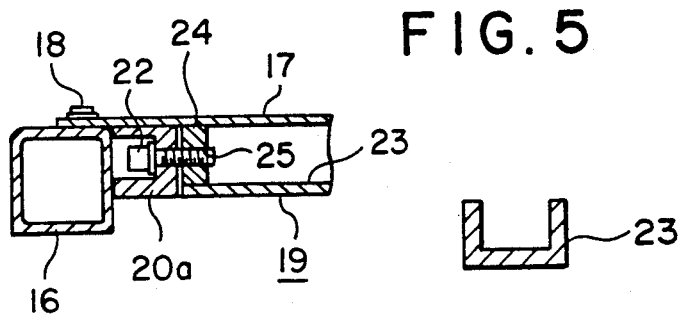
FIG. 8
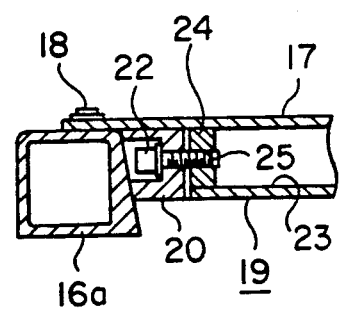
FIG. 9
FIG. 6
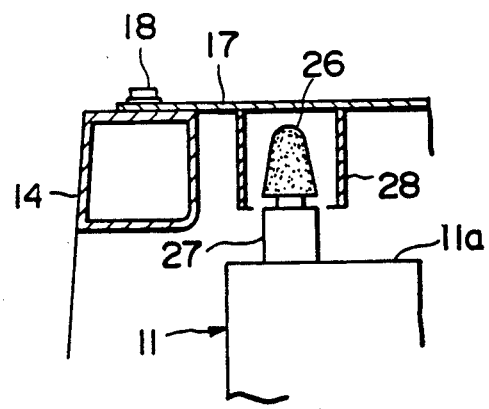
FIG. 7

OPERATOR COMPARTMENT PROTECTING DEVICE FOR CONSTRUCTION VEHICLES

FIELD OF THE INVENTION

The present invention relates to an operator compartment protecting device adapted to be mounted on a construction vehicle, such as a motor grader. In a specific aspect, the invention relates to a construction vehicle having an operator compartment and an operator compartment protecting device.

BACKGROUND OF THE INVENTION

Construction vehicles, such as a motor grader, are usually operated at uneven sites, and are provided with an operator compartment protecting device in order to protect the operator in the event of falling objects or the vehicle is overturned.

For example, an operator compartment protecting device 4, including a support pole 2 and a ceiling 3, as shown in FIG. 1, is mounted on a vehicle body 1 in order to prevent breakage of an operator compartment 5 which could occur if the vehicle is overturned or hit by a falling object, and such device thereby protects the operator. In such an operator compartment protecting device 4, the support pole 2 is permanently fixed to the ceiling 3 by welding, and the lower portion of the support pole 2 is firmly mounted on the vehicle body 1 by means of bolts. The ceiling 3 protrudes over the operator compartment 5. Thus, when the hydraulic units or the like mounted on the vehicle body 1 below the operator compartment 5 are to be inspected or repaired, the operator compartment 5 cannot be lifted out of the way because of the presence of the operator compartment protecting device 4. The operator compartment protecting device 4 must first be unbolted and moved aside, and then the operator compartment 5 can be lifted up and moved out of the way.

However, the work of removing the operator compartment protecting device 4 is very troublesome and expensive, because the support pole 2 is firmly mounted on the vehicle body 1 by means of the bolts, and loosening of the bolts is difficult, and further because the operator compartment protecting device 4 is very heavy and thus requires lifting gear, such as a crane or a wrecker truck, to remove it. Accordingly, the inspection or repair of the portion of the vehicle body 1 located below the operator compartment 5 is very troublesome and expensive.

SUMMARY OF THE INVENTION

An object of the present invention is to provide an operator compartment protecting device for construction vehicles which is capable of overcoming the aforementioned problems of the conventional devices.

To achieve the above object, the present invention provides an operator compartment protecting device for construction vehicles which enables an operator compartment to be lifted by merely loosening the bolts of a ceiling plate. The operator compartment protecting device includes at least one support adapted to extend at least generally vertically from the vehicle body. The support can be a gate-shaped support, including a pair of vertical members and at least one connecting member, mounted to the vehicle body on at least one location spaced from the side of the operator compartment, preferably so as to extend laterally of the vehicle. The connecting member can extend horizontally between and be permanently fixed to an upper end portion of one of the pair of vertical members and an upper end portion of the other of the pair of vertical members. The operator compartment protecting device includes a pair of beam members, each being fixed, e.g., by welding, to the upper end portion of each of the pair of vertical members in such a manner that the beam members extend along opposite sides of the operator compartment, with the beam members forming an opening therebetween above the operator compartment with the distance between the beam members being at least slightly greater than the corresponding dimension of the operator compartment. A ceiling plate is placed over and removably secured, e.g., by means of bolts, to each of the pair of beam members to protect the operator compartment from above. Upon the ceiling plate being released from the pair of beam members, the operator compartment can be lifted through the opening between the beam members, thereby providing access to portions of the vehicle body below the operator compartment.

BRIEF DESCRIPTION OF THE DRAWINGS

FIG. 5 is a cross-section taken along the line A—A of FIG. 2;

FIG. 6 is a cross-sectional view of a channel member;

FIG. 7 is a cross-section taken along the line B—B of FIG. 3;

FIG. 8 is a cross-sectional view, corresponding to FIG. 5, of a second embodiment of the invention; and FIG. 9 is a cross-sectional view, corresponding to FIG. 5, of a third embodiment of the invention.

DETAILED DESCRIPTION OF THE PREFERRED EMBODIMENTS

Figure 1:
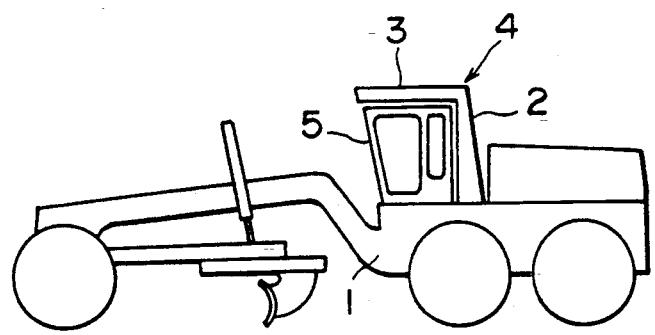
FIG. 1 is a side elevational view of a conventional operator compartment protecting device which is mounted on a motor grader.
Figure 2:
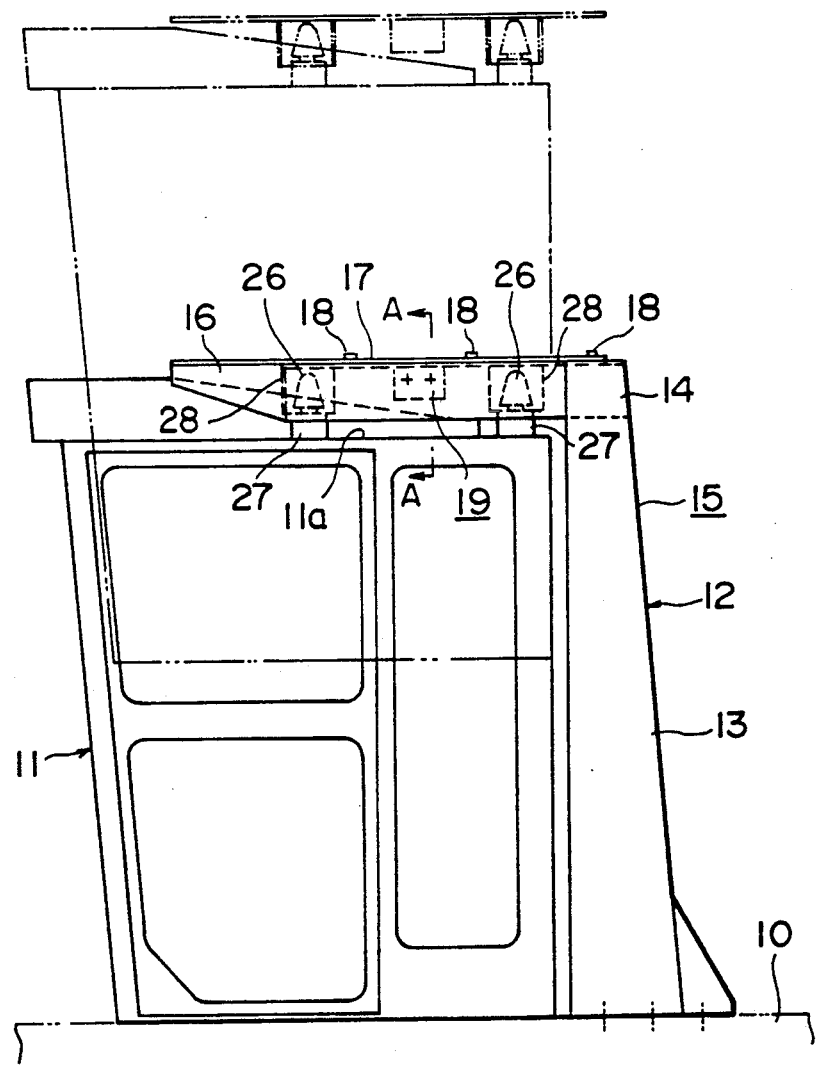
FIG. 2 is a left-side elevational view of an operator compartment protecting device mounted on a construction vehicle, showing an embodiment of the present invention.
Figure 3:
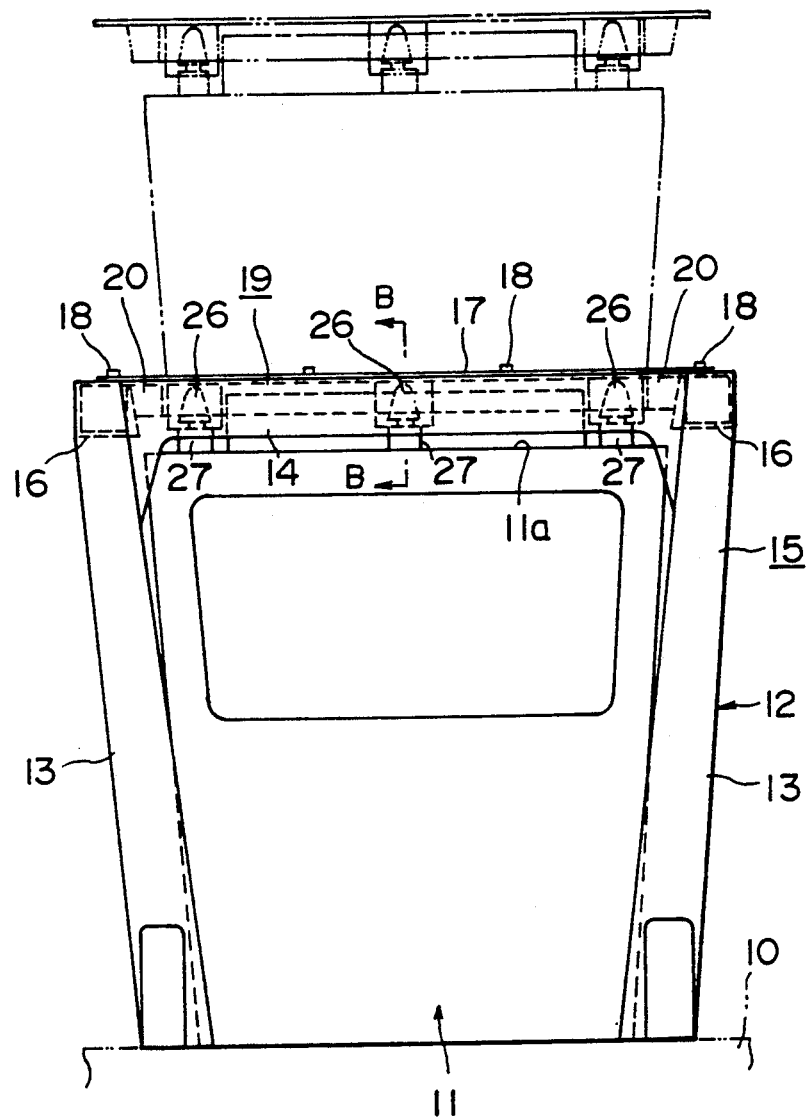
FIG. 3 is a rear view of the operator compartment protecting device of FIG. 2.
Figure 4:
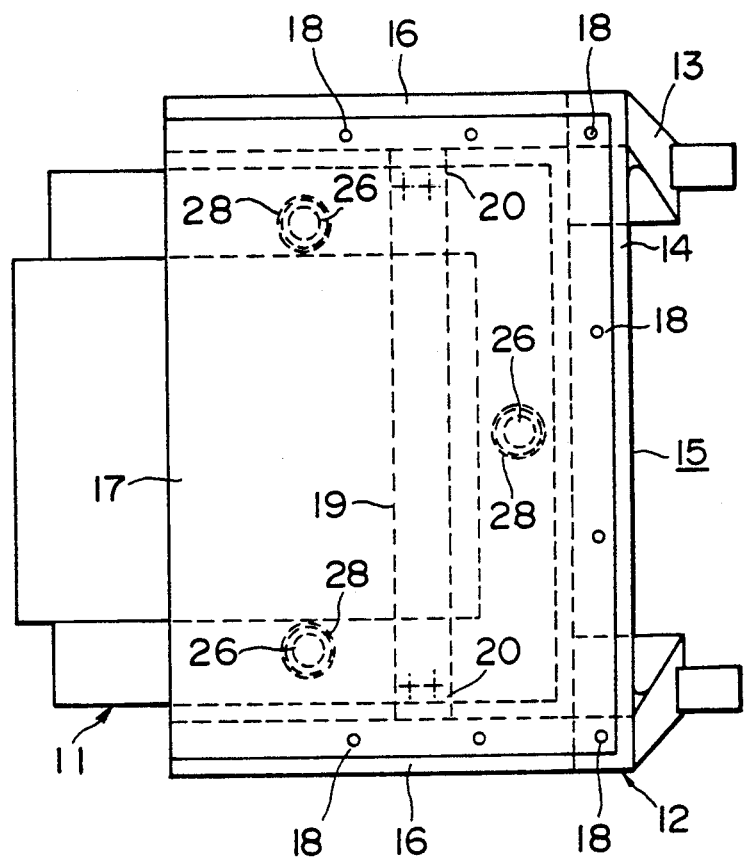
FIG. 4 is a plan view of the operator compartment protecting device of FIG. 2.

As shown in FIGS. 2, 3 and 4, an operator compartment 11 is mounted on a vehicle body 10, and an operator compartment protecting device 12 is mounted on the vehicle body 10 at a location to the rear of the operator compartment 11.

The operator compartment protecting device 12 includes a gate-shaped support 15 having a pair of right and left vertical members 13 and a connecting horizontal member 14 extending between and fixed, e.g., by welding, to the inner side of the upper end portion of the left-side vertical member 13 and the inner side of the upper end portion of the right-side vertical member 13. Each of a pair of right and left beam members 16 is fixed, e.g., by welding, to the front surface of the upper end portion of each of the pair of vertical members 13 in such a manner that the left and right beam members 16 are directed in a forward direction, with respect to the gate-shaped support 15. Thus, the beam members 16 extend along opposite sides of the operator compartment 11, with the beam members 16 forming an opening therebetween above the operator compartment 11, with the distance between the beam members 16 being at least slightly greater than the corresponding dimension of the operator compartment 11. A ceiling plate 17 is placed over and releasably secured to the upper surface of each of the pair of beam members 16 and the connecting member 14 by readily releasable means, e.g., bolts 18. If desired, the ceiling plate can also be releasably secured to the upper end surface of each of the pair of vertical members 13. The ceiling plate 17 extends at least generally horizontally forwardly from the gate-shaped support 15 to overhang at least a substantial portion of the operator compartment 11.

A reinforcing member 19 is fixed, preferably permanently, e.g., by welding, to the lower surface of the ceiling plate 17 at an intermediate portion thereof in the longitudinal direction of the vehicle in such a manner that the reinforcing member 19 extends at least generally in the lateral direction of the vehicle, and preferably extends at least substantially perpendicularly to the longitudinal axis of the vehicle. Each of the right end and the left end of the reinforcing member 19 can be provided with an adjusting block 20, as shown in FIG. 5. Each adjusting block 20 is adjustably mounted on the respective end of reinforcing member 19 by suitable means, e.g., a bolt 22 extending through the end plate 24 of reinforcing member 19 with one end of the adjusting block 20 being positioned between the head of bolt 22 and the end plate 24. The adjusting block 20 can make contact directly with the inner side surface of a respective one of the pair of beam members 16, as shown by adjusting block 20a in FIG. 8 for the second embodiment of the invention, the other elements being the same as in FIG. 5. However, it is presently preferred to secure a shim 21 to the beam member 21 such that the effective inner side surface of the beam member 21 is tapered downwardly and inwardly from the vertical by an acute angle, e.g., in the range of about 2° to about 10°. The shim 21 can be welded to the beam 16 or it can be formed as an integral part of the beam 16, as shown by beam 16a in FIG. 9 for the third embodiment of the invention, the other elements being the same as in FIG. 5.

The reinforcing member 19 comprises a U-shaped channel member 23, with each longitudinal end portion thereof having an end plate 24 suitably fixed thereto, e.g., by welding. Each end plate 24 has an internally threaded hole 25 formed therein to receive the threaded portion of the respective bolt 22. A crosssectional view of the channel member 23 is shown in FIG. 6. As shown in FIG. 5, the position of each force-transmitting adjusting block 20 with respect to the associated reinforcing member 19 can be varied by the adjustment of the bolt 22 with respect to the associated end plate 24.

The operator compartment 11 has a generally rectangular box-like form. The maximum width of the operator compartment 11 in the lateral direction is slightly less than the distance between the inner side surfaces of the pair of forwardly extending beam members 16. As shown in FIG. 7, each cushioning member 26 is mounted by a respective columnar support member 27 on an upper surface 11a of the operator compartment 11. As shown in FIGS. 2 to 4, a plurality of the cushioning members 26 can be located at spaced apart locations on upper surface 11a, e.g., a right front portion of surface 11a, a left front portion of surface 11a, and a central rear portion of surface 11a. Any suitable number of cushioning members 26, equal to, less than or greater than the three illustrated, can be employed. For example, additional cushioning members 26 could be placed at a right rear portion of surface 11a, a left rear portion of surface 11a, and at an intermediate or central portion of surface 11a. Each of the support members 26 telescopically protrudes into a respective one of a plurality of cylindrical tubular guides 28, which are suitably fixed, e.g., by welding, at correspondingly spaced apart locations on a lower surface of the ceiling plate 17.

The operation of the operator compartment protecting device will now be described. If the bolts 18 are released from engagement with the beams 16, transverse member 14, and vertical supports 13, the portion of the operator compartment protecting device 12 which overlays the operator compartment 11, i.e., the ceiling plate 17, reinforcing member 19, and tubular guides 28, can be readily removed. Then, the operator compartment 11 can be merely lifted or lifted and then moved out of the way. This allows the portion of the vehicle body 10 which is located below the operator compartment 11, when the operator compartment 11 is in its normal position on the vehicle body 10, to be easily inspected or repaired.

If the operator compartment 11 is lifted with the bolts 18 disengaged from the forwardly extending beams 16, the transverse beam 14, and the vertical supports 13, but with the ceiling plate 17 still in its normal position, the supporting members 26 make contact with the lower surface of the ceiling plate 17, and then the ceiling plate 17 is lifted together with the operator compartment 11. It is thus not necessary for the ceiling plate 17 to be removed prior to the lifting of the operator compartment 11. When the operator compartment 11 is lowered into its normal place on the vehicle body 10, the ceiling plate 17 can be simultaneously or subsequently positioned on the vehicle body 10 with a peripheral edge portion of the ceiling plate 17 overlying at least a portion of the upper surface of each of the beam members 16, the upper surface of the connecting horizontal member 14, and the upper end surface of each of the vertical members 13. In that state, the ceiling plate 17 can be releasably secured to the beams 16 and the connecting horizontal member 14 by the bolts 18.

When an object falls and strikes the ceiling plate 17, i.e., when a force acts on the ceiling plate 17 from above, that force dissipates and transmits through the ceiling plate 17 and through the reinforcing member 19 and the adjusting blocks 20 to the right and left beam members 16. Therefore, even if the ceiling plate 17 is not highly rigid, the ceiling plate 17 will generally not be deformed.

Reasonable variations and modifications are possible within the scope of the foregoing description, the drawings and the appended claims to the invention. For example, the vertical members 13 can be bolted to the horizontal connecting member 14 instead of being permanently secured thereto. The ceiling plate 17 can extend forwardly over the entire longitudinal length of the operator compartment 11. Two or more lateral reinforcing members 19 can be provided or the lateral reinforcing member 19 can be omitted. The lateral reinforcing member 19 can be mounted on the top surface of the ceiling plate 17 instead of on the bottom surface. Any other suitable releasable securing means, e.g., spring loaded latches, can be employed instead of bolts 18 to releasably secure the ceiling plate 17 to the beams 16 and/or the transverse beam 14. The adjusting blocks 20 can be replaced with other force transmitting mechanisms or omitted. The ceiling plate 17 can be provided with vertical side flanges and some or all of the bolts 18 or other releasably securing elements can extend horizontally through the side flanges and either or both of the inner side surfaces and the outer side surfaces of the beams 16 and/or transverse member 14. The gate-shaped structure can be releasably or permanently mounted at any one or more sides of the operator compartment, e.g., at a location in front of the operator compartment, at a location to the left of the compartment, at a location to the right of the compartment, and/or at a location to the rear of the compartment, so long as the distance between any two opposite horizontal supports for the ceiling 17 is greater than the corresponding dimension of the operator compartment so that the removal of the ceiling plate 17 permits the lifting of the operator compartment 11 through the opening between the horizontal supports for the ceiling plate 17.

What is claimed is:

1. An operator compartment protecting device, said device being adapted to be mounted beside and above an operator compartment on a vehicle body of a construction vehicle, said device comprising:
   at least one support adapted to extend upwardly from the vehicle body;
   a pair of beam members secured to an upper end portion of said at least one support in such a manner that they extend along opposite sides of the operator compartment, said beam members forming an opening therebetween above the operator compartment with the distance between said beam members being at least slightly greater than the corresponding dimension of the operator compartment;
   a ceiling plate releasable secured to at least said pair of beam members, whereby upon said ceiling plate being released from said at least said pair of beam members the operator compartment can be lifted through the opening between said beam members;
   at least one laterally extending reinforcing member fixed to a surface of said ceiling plate, each reinforcing member having first and second longitudinally spaced apart end portions, a first force-transmitting adjusting block adjustably mounted on said first end portion, a second force-transmitting adjusting block adjustably mounted on said second end portion, each said force-transmitting adjusting block making contact with a side surface of a respective one of said beam members, whereby the positions of said first and second force-transmitting adjusting blocks with respect to the associated reinforcing member can be varied.

2. An operator compartment protecting device in accordance with claim 1, wherein said ceiling plate is releasably secured to said pair of beam members by bolts.

3. An operator compartment protecting device in accordance with claim 1, wherein said at least one support comprises a gate-shaped support, said gate-shaped support comprising at least a pair of support members which extend upwardly and at least one connecting member which extends from an upper portion of one of said pair of support members to an upper portion of the other of said pair of support members.

4. An operator compartment protecting device in accordance with claim 1, wherein said at least one support comprises a gate-shaped support which is adapted to be mounted at the rear of the operator compartment so as to extend laterally of the vehicle.

5. An operator compartment protecting device, said device being adapted to be mounted beside and above an operator compartment on a vehicle body of a construction vehicle, said device comprising:
   at least one support adapted to extend upwardly from the vehicle body;
   a pair of beam members secured to an upper end portion of said at least one support in such a manner that they extend along opposite sides of the operator compartment, said beam members forming an opening therebetween above the operator compartment with the distance between said beam members being at least slightly greater than the corresponding dimension of the operator compartment;
   a ceiling plate releasably secured to at least said pair of beam members, whereby upon said ceiling plate being released from said at least said pair of beam members the operator compartment can be lifted through the opening between said beam members; and
   a plurality of tubular guides fixed to a lower surface of said ceiling plate, each of said tubular guides being adapted to telescopically receive therein a respective one of a plurality of columnar support members mounted at spaced apart locations on an upper surface of the operator compartment.

6. An operator compartment protecting device in accordance with claim 5, further comprising at least one laterally extending reinforcing member fixed to a surface of said ceiling plate.

7. An operator compartment protecting device in accordance with claim 5, wherein said ceiling plate is releasably secured to said pair of beam members by bolts.

8. An operator compartment protecting device in accordance with claim 5, wherein said at least one support comprises a gate-shaped support which is adapted to be mounted at the rear of the operator compartment so as to extend laterally of the vehicle.

9. An operator compartment protecting device in accordance with claim 1, further comprising a plurality of tubular guides fixed to a lower surface of said ceiling plate, each of said tubular guides being adapted to telescopically receive therein a respective one of a plurality of columnar support members mounted at spaced apart locations on an upper surface of the operator compartment.

10. A construction vehicle having a vehicle body, an operator compartment releasably positioned on said vehicle body, and an operator compartment protecting device mounted to said vehicle body so as to be beside and above said operator compartment, said device comprising:
    at least one support extending upwardly from said vehicle body;
    a pair of beam members secured to an upper end portion of said at least one support in such a manner that they extend along opposite sides of the operator compartment, said beam members forming an opening therebetween above the operator compartment with the distance between said beam members being at least slightly greater than the corresponding dimension of the operator compartment;

a ceiling plate releasably secured to at least said pair of beam members, whereby upon said ceiling plate being released from said at least said pair of beam members the operator compartment can be lifted through the opening between said beam members; and at least one laterally extending reinforcing member fixed to a surface of said ceiling plate, each reinforcing member having first and second longitudinally spaced apart end portions, a first force-transmitting adjusting block mounted on said first end portion, a second force-transmitting adjusting block mounted on said second end portion, each said force-transmitting adjusting block making contact with a side surface of a respective one of said beam members, whereby the positions of said first and second force-transmitting adjusting blocks with respect to the associated reinforcing member can be varied.

11. A construction vehicle in accordance with claim 10, wherein said ceiling plate is releasably secured to said pair of beam members by bolts.

12. A construction vehicle in accordance with claim 10, wherein said at least one support comprises a gate-shaped support, said gate-shaped support comprising at least a pair of support members which extend upwardly from said vehicle body and at least one connecting member which extends from an upper portion of one of said pair of support members to an upper portion of the other of said pair of support members.

13. A construction vehicle in accordance with claim 10, wherein said at least one support comprises a gate-shaped support permanently secured to said vehicle body at a location to the rear of the operator compartment so as to extend laterally of the vehicle.

14. A construction vehicle having a vehicle body, an operator compartment releasably positioned on said vehicle body, and an operator compartment protecting device mounted to said vehicle body so as to be beside and above said operator compartment, said device comprising:
at least one support extending upwardly from said vehicle body;
a pair of beam members secured to an upper end portion of said at least one support in such a manner that they extend along opposite sides of the operator compartment, said beam members forming an opening therebetween above the operator compartment with the distance between said beam members being at least slightly greater than the corresponding dimension of the operator compartment;
a ceiling plate releasably secured to at least said pair of beam members, whereby upon said ceiling plate being released from said at least said pair of beam members the operator compartment can be lifted through the opening between said beam members; and
a plurality of columnar support members mounted at spaced apart locations on an upper surface of the operator compartment, each columnar support member protruding into a respective one of a plurality of tubular guides fixed to a lower surface of said ceiling plate.

15. A construction vehicle in accordance with claim 14, further comprising at least one laterally extending reinforcing member fixed to a surface of said ceiling plate.

16. A construction vehicle in accordance with claim 14, wherein said ceiling plate is releasably secured to said pair of beam members by bolts.

17. A construction vehicle in accordance with claim 14, wherein said at least one support comprises a gate-shaped support which is mounted to the vehicle body at a position to the rear of the operator compartment so as to extend laterally of the vehicle.

18. A construction vehicle in accordance with claim 10, further comprising a plurality of columnar support members mounted at spaced apart locations on an upper surface of the operator compartment, each columnar support member protruding into a respective one of a plurality of tubular guides fixed to a lower surface of said ceiling plate.

19. An operator compartment protecting device in accordance with claim 1, wherein each side surface of one of said beam members which is in contact with a force-transmitting adjusting block is tapered downwardly and inwardly from the vertical by an acute angle to form a shim surface.

20. A construction vehicle in accordance with claim 10, wherein each side surface of one of said beam members which is in contact with a force-transmitting adjusting block is tapered downwardly and inwardly from the vertical by an acute angle to form a shim surface.

* * * * *